ated Jan. 12, 1971

United States Patent Office
3,555,110
Patented Jan. 12, 1971

3,555,110
BLENDS OF ALPHA-MONOOLEFIN BLOCK CO-POLYMERS WITH ETHYLENE-ACRYLATE OR ALKENYL CARBOXYLATE COPOLYMERS
Richard L. McConnell and Max F. Meyer, Jr., Kingsport, Tenn., assignors to Eastman Kodak Company, Rochester, N.Y., a corporation of New Jersey
No Drawing. Continuation-in-part of application Ser. No. 507,677, Nov. 15, 1965. This application May 7, 1969, Ser. No. 822,727
Int. Cl. C08f 29/12, 29/40, 29/46
U.S. Cl. 260—876
10 Claims

ABSTRACT OF THE DISCLOSURE

Copolymers such as ethylene/alkyl acrylate, ethylene/aryl acrylate and ethylene/alkenyl carboxylate are highly compatible with 2-period sequential alpha-monoolefin block polymers such as propylene/ethylene polymers having from about 50% to about 99% by weight of polypropylene segment in the polymer chain. Molded objects prepared from 2-period sequential block polymer and ethylene/alkyl acrylate, ethylene/aryl acrylate, and ethylene/alkenyl acrylate blends have excellent clarity, improved low temperature properties and good impact strength at low temperature.

---

This application is a continuation-in-part of U.S. Ser. No. 507,677, filed Nov. 15, 1965 now abandoned.

This invention relates to novel polymer blends having improved physical properties. One of the aspects of this invention relates to novel 2-period sequential block polymer blends having improved low temperature properties. Another aspect of this invention concerns the novel blends of 2-period sequential block polymer and ethylene/alkyl acrylate, ethylene/aryl acrylate and ethylene/alkenyl carboxylate copolymers to provide polymer blends having improved physical properties.

It is well known in prior art to blend polyethylene with ethylene/ethyl acrylate or ethylene/vinyl acetate copolymers. The known blends usually containing 20-30% of the copolymer blending agent have some improvement in physical properties such as improved stress crack resistance. However, the resultant blend also has a degradation of other physical properties such as a marked decrease in stiffness and is often accompanied by low clarity, or it even becomes opaque. It is also known in the art to blend polypropylene with ethylene/alkyl acrylate copolymers to improve certain physical properties. However, these blends also have a degradation of other physical properties such as a decrease in stiffness and hardness. These blends also do not possess favorable low temperature properties and become brittle in low temperature applications. It is evident, therefore, that the state of the art will be greatly enhanced by providing novel polymeric blends having good compatibility which produces a very clear product with excellent low temperature properties, high impact strength and relatively good stiffness characteristics.

Accordingly, it is one of the objects of this invention to provide novel polymeric blends containing 2-period sequential block polymer which have improved physical properties.

Another object of this invention is to provide novel blends of polymers having improved low temperature-properties.

A further object of the present invention is to provide novel blends of polymers containing 2-period sequential block polymer having improved clarity.

Still another object of the invention is to provide novel polymer blends having improved impact strength.

Another and still further object of the invention is to provide novel polymeric blends containing 2-period sequential block polymer having an improvement in certain physical properties without a substantial degradation of other physical properties.

Further objects of this invention will become apparent from the examination of the following description and claims.

In accordance with this invention, it has been found that a novel product may be produced having improved physical properties including a combination of high degree of clarity, excellent low temperature properties, and improved impact resistance by blending 2-period sequential block polymers with ethylene/alkyl acrylate, ethylene/aryl acrylate or ethylene/alkenyl carboxylate copolymers. The compatibility of the 2-period sequential block polymers with other polymeric materials is completely different from that of the homopolymers. For example, polypropylene blends with ethylene/ethyl acrylate copolymer produces a product with great loss of rigidity, low impact strength, relatively poor brittleness temperature and lack of clarity. In contradistinction, the 2-period sequential block polymer when blended with a copolymer such as ethylene/ethyl acrylate produces a very clear product with excellent low temperature properties, high impact strength and relatively good stiffness characteristics.

Further, these polymeric blends, when compared to the 2-period sequential block polymer, have improved physical properties such as low temperature properties and impact strength without substantial degradation of the other desirable polymer physical properties, such as hardness and stiffness.

The 2-period sequential block polymers of this invention are readily prepared using stereospecific coordination catalysts such as, for example, $$C_2H_5AlCl_2/0.6[(CH_3)_2N])_3P(O)/TiCl_3$$

or $C_2H_5AlCl_2/0.7(C_4H_9)_3N/TiCl_3$. In general, the 2-period sequential block polymers are prepared by polymerizing an alpha-olefin, such as propylene, at a temperature such as 70° C., then adding another alpha-olefin, such as ethylene, to the reaction mixture and the polymerization is continued to produce a block polymer containing segments of propylene units and ethylene units, or a 2-period sequential block polymer. Suitable alpha-olefins for use in preparing 2-period sequential block polymers include, for example, ethylene, propylene, 1-butene, 1-pentene, 1-hexene, 1-heptene, 1-octene, 1-decene, 1-dodecene, 1-octadecene, 1-eicosene, 3-methyl-1-butene, 4-methyl-1-pentene, 4-methyl-1-hexene, 5-methyl-1-hexene, 4,4-dimethyl-1-pentene, styrene, allylbenzene, allylcyclohexane, allylcyclopentane, vinylcyclohexane, and other similar suitable alpha-olefins. One of the polymerizable alpha-olefins contains at least 3 carbon atoms. These 2-period sequential block polymers generally have only two segments in the polymer chain and consist of from about 50% to about 99% by weight of polypropylene segments and conversely from about 50% to about 1% by weight of different polymerized alpha-monoolefin segment.

In general, these block polymers have a high level of desirable physical properties. However, these block polymers in certain low temperature applications have poor impact strength which restricts their use for applications requiring both excellent low temperature properties and good impact strength at these low temperatures.

It has been found that copolymers such as ethylene/alkyl acrylate, ethylene/aryl acrylate and ethylene/alkenyl carboxylate are highly compatible with polymers such as 2-period sequential block propylene/ethylene polymers having 70% polypropylene segment in the polymer chain. Molded objects prepared from 2-period sequential block polymer and ethylene/alkyl acrylate, ethylene/aryl acrylate or ethylene/alkenyl acrylate blends have excellent clarity, improved low temperature properties and good impact strength at low temperatures. The clarity of these blends is far superior to that obtained when blending ethylene/alkyl acrylate, ethylene/aryl acrylate or ethylene/alkenyl carboxylate copolymers with polypropylene. Good low temperature properties are achieved with relatively small amounts of ethylene copolymer as compared to a blend of polypropylene or polyethylene with the ethylene copolymers. For example, a brittleness temperature of −40° C. is required for many automotive applications. At least 20% of ethylene copolymer is required to reduce the brittleness temperature of polypropylene prepared according to U.S. Pat. 2,969,345, to −40° C., however only about 3 to about 15% of ethylene/alkyl acrylate, ethylene/aryl acrylate or ethylene-alkenyl acetate copolymer is necessary to lower the brittleness temperature of 2-period sequential block propylene/ethylene block polymers to less than −40° C.

Ethylene/alkyl acrylate, ethylene/aryl acrylate or ethylene/alkenyl carboxylate copolymers which can be blended according to this invention are readily prepared from ethylene and an alkyl acrylate, alkyl methacrylate, vinyl esters of a carboxylic acid and isopropenyl esters of a carboxylic acid using a peroxide catalyst. Preferred supplemental copolymers of this invention contain from about 60 to about 99% ethylene. The alkyl group of the acrylate or methacrylate can contain from 1 to 12 carbon atoms and can be a straight or branched chain group. Aryl acrylate copolymers such as those prepared from phenyl acrylate and ethylene are also useful. The alkenyl carboxylate may be any common carboxylate, however, vinyl acetate and isopropenyl acetate are preferred for economic reasons. The higher carboxylic esters such as those derived from propionic, butyric or 2-ethylhexanoic acids can also be used.

Some commercial ethylene copolymers which are suitable for blending with the 2-period sequential block polymers are the ethylene/ethyl acrylate copolymers containing about 15% ethyl acrylate sold by Dow Chemical Company under the trademark Zetafin; ethylene/methyl acrylate copolymers containing 12–15% methyl acrylate sold by Spencer Chemical Company under the trademark Poly-Eze; and ethylene/vinyl acetate copolymers containing about 25% vinyl acetate sold by E. I. du Pont under the trademark Elvax.

In order to obtain blends of the 2-period sequential block polymers and the ethylene copolymer which have improved optical, low temperature, and impact properties, it is preferable that the 2-period sequential block polymers, such as for example, propylene/1-butene, have a degree of stereoregularity of at least 85%. The molecular weight of the 2-period sequential block polymers does not appear to have an appreciable effect on the compatibility of the polymers. For example, 2-period sequential block polymers having inherent viscosities varying from less than 0.1 to more than 5 have been blended successfully with ethylene/alkyl acrylate, ethylene/aryl acrylate or ethylene/alkenyl carboxylate copolymers described in this invention. The molecular weight of the ethylene/alkyl acrylate, ethylene/aryl acrylate or ethylene/alkenyl carboxylate copolymers can, likewise, be varied over a wide range and remain compatible with the 2-period sequential block polymers.

The amount of ethylene/alkyl acrylate, ethylene/aryl acrylate or ethylene/alkenyl carboxylate copolymers can also be varied from less than 1%, preferably about 3%, to about 30%, by weight, depending on the optical properties, brittleness temperature and impact properties desired in the product. However, it has been found that about 1 to 15%, by weight, of the ethylene/alkyl acrylate, ethylene/aryl acrylate or ethylene/alkenyl carboxylate copolymer generally is sufficient to provide adequate properties for low temperature applications in accordance with this invention.

The polymer blends according to this invention can also contain various additives such as stabilizers, antioxidant, plasticizers, lubricants, carbon black or coloring agents which are normally used in polyolefins. Such additives may be added to the composition of this invention in necessary amounts, as is known to those skilled in the art, without significantly detracting from the beneficial properties of the blends.

This invention can be further illustrated by the following examples of preferred embodiments thereof; although it will be understood that these examples are included merely for purposes of illustration and are not intended to limit the scope of the invention unless otherwise specifically indicated.

EXAMPLE 1

A propylene/ethylene 2-period sequential block polymer was prepared in a 500 ml. Parr reaction bottle which was carefully washed and then dried at 110° C. This clean, dry bottle was charged with about 75 ml. of dry benzene, about 75 ml. of dry heptane, about 1.8 g. of $C_2H_5AlCl_2 \cdot 0.6[(CH_3)_2N]_3P(O)$ adduct, and about 1.2 g. of $TiCl_3$ in a dry box maintained under an atmosphere of dry nitrogen. The bottle was attached to a Parr shaker and flushed with dry propylene. The bottle was then heated to about 50° C. with shaking and propylene was added continuously until about 50 p.s.i. of propylene had been absorbed. Then the bottle was cooled to room temperature and vented to remove any unreacted propylene. The bottle was then pressured with ethylene and ethylene pressure was maintained until the reaction mixture had absorbed 53 p.s.i. of ethylene at 25° C. The bottle was vented and isobutyl alcohol was added to deactivate the catalyst. The 2-period sequential block polymer was washed with isobutyl alcohol at 100° C. to remove catalyst residues. After air drying, about 80 g. of white, granular block polymer was obtained having an inherent viscosity of 5.39, a density of 0.916, and an ethylene content of 13% as measured by infrared analysis. Propylene/ethylene 2-period sequential block polymers having different compositions are prepared by varing the amount of ethylene absorbed in the second stage of the reaction.

Propylene/1-butene and propylene/4-methyl-1-pentene 2-period sequential block polymers were prepared in a similar manner by using 1-butene and 4-methyl-1-pentene, respectively, instead of ethylene in the second stage of the polymerization.

The following Table 1 which compares several important properties of polypropylene and two of the present 2-period sequential block propylene/ethylene polymers of 5 and 15% by weight ethylene content, shows the changes in properties resulting from the block type polymer structure. It is noted that even at low (5%) ethylene levels, the polymer structure is substantially different from polypropylene. In the table, the two melting point values of 126 and 161 represent respectively, crystalline polyethylene and crystalline polypropylene segments.

TABLE 1

| Property | ASTM method No. | Polypropylene | 2-period sequential | |
|---|---|---|---|---|
| | | | Propylene ethylene | Block copolymer |
| Ethylene, percent (by infrared analysis) | | 0 | 5 | 15 |
| Melt flow rate, dg./min. 230° C./2.16 kg | D1238–62T | 1.9 | 3.0 | 1.7 |
| Hardness, Rockwell R scale | D785–62 | 99 | 89 | 85 |
| Notched Izod impact strength, ft. lb./in | D256–56 | 0.5 | 2.0 | 4.3 |
| Tensile impact strength, ft. lb./in.² | D1822–61T | 143 | >312 | >312 |
| Brittleness temp., ° C | D746–57T | −10 | −28 | −33 |
| M.P. by differential thermal analysis, ° C | | 165 | 169 | 126, 161 |
| Stiffness, p.s.i | D747 | 165,000 | 120,000 | 11,000 |

EXAMPLE 2

A 2-period sequential block propylene/ethylene polymer containing 13% by weight ethylene (M.F. 0.7) was blended with Zetafin 30 having a melt index of about 2.6 (ASTM D–1238–56T) which is an ethylene/ethyl acrylate copolymer containing 15% ethyl acrylate. Compositions of 2, 5, 10, and 20% by weight Zetafin 30 were blended in a Banbury mixer. These compositions contained 0.2% dilauryl thiodipropionate and 0.1% dioctadecyl-p-cresol to prevent degradation of the polymers during blending and subsequent molding operations. All compositions molded well and the molded specimens were crystal clear. The films pressed from the blends had excellent gloss and clarity and were very tough.

EXAMPLE 3

A 2-period sequential block propylene/ethylene copolymer containing 3% by weight ethylene (M.F. 1.4) was blended with Zetafin 30. Compositions of 1, 5, and 20% by weight Zetafin 30 were blended according to the procedure of Example 2. The blends showed good compatibility and had excellent low temperature properties similar to those shown in Example 2.

The results obtained when Zetafin 30 was blended with 2-period sequential block propylene/ethylene polymers containing 1, 5, 20, and 26% ethylene also showed similar improvements in physical properties.

EXAMPLE 4

A 2-period sequential block propylene/ethylene co polymer containing 10% by weight ethylene (M.F. 1.6) was blended with ethylene/vinyl acetate copolymer containing 20% by weight vinyl acetate having a melt index of about 2.1. Compositions containing 5, 10, and 20% by weight of ethylene/vinyl acetate copolymer were blended according to the procedure of Example 2. Molded specimens exhibited excellent compatibility and clarity, in addition to a marked improvement in physical properties similar to those shown in Table 2.

Good results were also obtained when 2-period sequential block propylene/ethylene polymers containing 1, 3, 15, 20, and 30% ethylene were blended with ethylene/vinyl acetate copolymer (M.I. 2.1).

EXAMPLE 5

A low viscosity 2-period sequential block propylene/ ethylene polymer (melt viscosity 10,000 centipoises at 190° C.) containing 10% by weight ethylene was melt blended with 5, 10, and 20% by weight ethylene/ethyl acrylate copolymer (I.V. 0.4) containing 12% ethyl acrylate. The toughness of these blends was demonstrated by the fact that films stored at −20° C. for 24 hours could be creased without breaking.

Similar results were obtained with other low viscosity 2-period sequential propylene/ethylene polymers containing 3, 6, 20 and 40% ethylene.

EXAMPLE 6

A low viscosity propylene/1-butene 2-period sequential block polymer (melt viscosity 25,000 cp. at 190° C.) containing 40% by weight of 1-butene was blended with 4, 8, 12, and 20% by weight ethylene/methyl acrylate copolymer (M.I. 1.0) containing 15% methyl acrylate. The toughness of these blends is demonstrated by the fact that films stored at −20° C. did not break or crack when creased at this low temperature.

Similarly good results were obtained with blends prepared from low-viscosity propylene/1-butene 2-period sequential block polymers containing 10, 25, or 50% 1-butene.

EXAMPLE 7

A propylene/1-butene 2-period sequential block polymer containing 10% by weight 1-butene (M.F. 1.0) was blended with ethylene/vinyl acetate copolymer (melt index 1.2) containing 22% by weight vinyl acetate. Compositions containing 5, 10, and 20% ethylene/vinyl acetate copolymer were blended in a Banbury mixer. The blends had good compatibility and excellent low temperature properties similar to those shown in Table 2.

Similarly good results were obtained when the propylene/1-butene 2-period sequential block polymers were blended with ethylene/isopropenyl acetate copolymers.

EXAMPLE 8

A propylene/4-methyl-1-pentene 2-period sequential block polymer (M.F. 0.6) containing 8% by weight 4-methyl-1-pentene was blended with ethylene/ethyl acrylate copolymer (M.I. 1.5) containing 14% by weight ethyl acrylate. Compositions containing 5, 10, and 20% ethylene/ethyl acrylate copolymer were prepared in a Banbury mixer. The blends had excellent compatibility and the blend containing 20% ethylene/ethyl acrylate copolymer had a brittleness temperature of −43° C.

TABLE 2

A comparison was made of 2-period sequential block polymer, polypropylene, and polyethylene blends containing Zetafin.

TABLE 2

| Properties (propylene/ethylene) | Control 2-period sequential 87/13 block copolymer | 2-period sequential 87/13 propylene/ ethylene block copolymer plus 10% Zetafin | 2-period sequential 87/13 propylene/ ethylene block copolymer plus 20% Zetafin | Polypropylene plus 10% Zetafin | Polypropylene plus 20% Zetafin | Polyethylene plus 10% Zetafin |
|---|---|---|---|---|---|---|
| Appearance | (1) | (2) | (2) | (1) | (1) | (3) |
| Melt Flow (M.F.) 230° C./2.16 kg.[4] | 0.7 | 0.9 | 1.2 | 1.0 | 2.0 | 0.41 |
| Hardness, Shore Durometer [5] | 70 | 69 | 68 | 71 | 65 | 65 |
| Izod impact strength at 23° C. ft. lb./in. of notch [6] | 4.3 | (7) | 11.7 | 1.6 | 2.6 | 15 |
| Brittleness temperature ° C.[8] | −22 | −38 | −44 | −28 | [9] −41, −29 | (10) |
| Blush rating [11] | 2 | 1 | 1 | 3 | 3 | 2 |
| Tensile impact strength, ft./lb./in.[2] | (10) | >320 | 251 | 263 | | 268 |

[1] Slightly hazy.
[2] Clear.
[3] Opaque.
[4] ASTM-D1238-62T.
[5] ASTM-D1706-61.
[6] ASTM-D256-56.
[7] No break, approximately 12-15 Izod.
[8] ASTM-D746-57T.
[9] The −41 for the polypropylene plus 20% Zetafin brittleness temperature was an isolated value and our experience has shown the −29 value to be more realistic.
[10] Not run.
[11] 3=Severe blushing; 2=Intermediate blushing; 1=No blushing.

This data clearly demonstrates that 2-period sequential block polymer containing 10% and 20% Zetafin has far better clarity, tensile impact strength, low temperature properties and notched Izod impact strength than the prior art polypropylene or polyethylene blends. The results obtained when ethylene/methyl acrylate, ethylene/dodecyl acrylate or ethylene/methyl methacrylate copolymers were blended with 2-period sequential block propylene/ethylene polymer were quite similar to those shown in the above Table 2.

The clarity and nonblushing of the block sequential polymer blend is exemplary of the high degree of compatibility which exists between the 2-period sequential block polymer and the supplemental acrylate copolymers. The nonblushing characteristics are very important in various applications where molded parts are subsequently bent, for example, in wind lace and cowl panels in automobiles. The characteristics of clarity and excellent low temperature properties qualify this polymer blend as an excellent material for molded materials for low temperature uses. It has been found to possess superior qualities over the prior art blends for making clear, tough blown bottles, refrigerator and freezer liners, tumblers for iced beverages, tough film for produce and feed bags and large garbage cans for outdoor winter use.

The blends of this invention are also useful for the preparation of films, molded objects, extruded shapes, tubular pipes, wire covering, etc., and conventional injection molding, compression molding and extrusion equipment can be used to form these articles. These molded products and films also have excellent printability and dyeability. The blends of this invention are readily prepared in conventional equipment used for blending various agents with plastic materials. For example, they may be blended in Banbury mixers, in extrusion equipment or on hot rolls.

Although this invention has been described in considerable detail with particular reference to certain preferred embodiments thereof, it will be understood that variations and modifications can be effected without departing from the spirit and scope of the invention.

We claim:

1. A polymeric composition having certain improved properties such as clarity, Izod impact strength, and low temperature properties, comprising a blend of alpha-monoolefin block polymer consisting essentially from about 50% to about 99% by weight of polypropylene segment and conversely from about 50% to about 1% by weight of different polymerized alpha-monoolefin segment, and from about 3% to about 30% by weight of ethylene copolymer containing from about 60% to about 99% by weight of combined ethylene, selected from the group consisting of ethylene/alkyl acrylate and ethylene/alkyl methacrylate, wherein the alkyl group contains from 1–12 carbons and is straight or branched chain, ethylene/phenyl acrylate and ethylene/phenyl methacrylate, and ethylene/vinyl acetate and ethylene/isopropenyl acetate.

2. The polymeric composition of claim 1 wherein the block polymer has an inherent viscosity of from less than 0.1 to about 5.

3. The polymeric composition according to claim 1 wherein the block polymer contains at least 80% propylene.

4. The polymeric composition of claim 1 wherein the ethylene/alkyl acrylate copolymer is ethylene/ethyl acrylate polymer.

5. The composition of claim 4 wherein the ethylene/ethyl acrylate copolymer contains about 15% ethyl acrylate.

6. The composition of claim 1 wherein the ethylene/alkyl acrylate copolymer is ethylene/methyl methacrylate.

7. The polymeric composition of claim 1 wherein the ethylene/aryl acrylate copolymer is ethylene/phenyl acrylate.

8. The polymeric composition of claim 1 wherein the ethylene/alkenyl carboxylate copolymer is ethylene/vinyl acetate.

9. The composition of claim 8 wherein the ethylene/vinyl acetate copolymer contains about 25% vinyl acetate.

10. The polymeric composition of claim 1 wherein the blend comprises at least about 85% by weight of block polymer having a degree of stereoregularity of at least 85%.

References Cited

UNITED STATES PATENTS 3,248,259   4/1966   Maloney   260—897

FOREIGN PATENTS 902,809   8/1962   Great Britain   260—897

SAMUEL H. BLECH, Primary Examiner

U.S. Cl. X.R.

260—878, 897